United States Patent
Creamer et al.

(10) Patent No.: US 7,099,653 B2
(45) Date of Patent: Aug. 29, 2006

(54) PRE-CONNECTION CALL AUTHENTICATION WITHIN A TELEPHONY NETWORK

(75) Inventors: Thomas E. Creamer, Boca Raton, FL (US); Peeyush Jaiswal, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/324,893

(22) Filed: Dec. 20, 2002

(65) Prior Publication Data

US 2004/0121759 A1    Jun. 24, 2004

(51) Int. Cl.
*H04M 1/66* (2006.01)
(52) U.S. Cl. .................. 455/410; 379/91; 379/112; 379/123; 380/277
(58) Field of Classification Search ........... 455/415, 455/410
See application file for complete search history.

(56) References Cited

U.S. PATENT DOCUMENTS

| | | | |
|---|---|---|---|
| 5,276,444 A * | 1/1994 | McNair | 340/5.8 |
| 5,511,111 A * | 4/1996 | Serbetcioglu et al. | 379/88.01 |
| 5,519,768 A * | 5/1996 | Moquin et al. | 379/100.01 |
| 5,544,235 A | 8/1996 | Ardon | 379/177 |
| 5,636,282 A * | 6/1997 | Holmquist et al. | 713/202 |
| 5,812,648 A | 9/1998 | Wanner | 379/142 |
| 6,035,039 A * | 3/2000 | Tisdale et al. | 380/249 |
| 6,157,823 A * | 12/2000 | Fougnies et al. | 455/406 |
| 6,253,075 B1 | 6/2001 | Beghtol et al. | 455/415 |
| 6,857,072 B1 * | 2/2005 | Schuster et al. | 713/160 |
| 2002/0056050 A1 * | 5/2002 | Heiden et al. | 713/201 |
| 2002/0118671 A1 * | 8/2002 | Staples et al. | 370/352 |
| 2003/0055990 A1 * | 3/2003 | Cheline et al. | 709/229 |
| 2003/0156690 A1 * | 8/2003 | Crockett et al. | 379/93.23 |

* cited by examiner

*Primary Examiner*—Lester G. Kincaid
*Assistant Examiner*—Fred A. Casca
(74) *Attorney, Agent, or Firm*—Akerman Senterfitt (57) ABSTRACT

A method for providing call authorization within a telephony network can include receiving a telephony connectivity request for establishing a telephony voice channel between the originating device and a receiving device. The specified receiving device can be determined and receiving device specific information that includes an authorization requirement can be accessed. A connection between the originating device and the receiving device can be established responsive to whether the authorization code satisfies the authorization requirement.

30 Claims, 4 Drawing Sheets

PRE-CONNECTION CALL AUTHENTICATION WITHIN A TELEPHONY NETWORK

BACKGROUND OF THE INVENTION

1. Technical Field

The present invention relates to the field of telecommunications and, more particularly, to pre-connection telecommunication authentication.

2. Description of the Related Art

Business interconnectivity demands have resulted in important business information being placed within networked resources. Consequently, security mechanisms have been developed and utilized to prevent unauthorized data access while assuring access can be granted to authorized users. Conventional security mechanisms attempt to prevent hostile system penetrations after a communication link has been established between a receiving or called computing device and an originating or calling computing device. Although unauthorized users may be prevented from accessing system resources, unauthorized users can be granted the opportunity to attack or "hack" into restricted areas using the established communication link.

Another situation where switch-level inbound call restrictions can be beneficial involves telephony privacy. Many home telephone owners, for example, can suffer from persistent, undesired telephone calls, such as the calls made by telemarketing companies. To many, such forced contacts and solicitations can be extremely annoying. Despite the annoyance, many providers of telephony services fail to provide inbound call screening mechanisms to customers. Instead, customers desiring a level of privacy have often been forced to purchase customer premise equipment (CPE) specifically designed to block or monitor calls. Such equipment can be expensive to purchase and can require substantial setup expenditures.

SUMMARY OF THE INVENTION

The invention disclosed herein provides a method and a system for pre-connection call authentication within a telephony network. In particular, the invention can perform call authorization functions before a receiving device is contacted. For example, in one embodiment, a telecommunication switch can access a network element that performs call authorization. This call authorization application can receive a connectivity request from an originating device desiring a connection to a receiving device. The call authorization application can determine if security restrictions exist against the receiving device and, if necessary, responsively send an authentication request to the originating device through a ringback channel.

The originating device can send an authentication response via a specified transmission channel over which a facsimile calling tone (FAX CNG) signal can be transmitted. This transmission channel can be called a CNG channel. Notably, both the ringback channel and the CNG channel are within the voice band (0–3,400 Hz) and can be utilized to convey signals before a telephony connection is established. The call authorization application can then grant or deny connectivity based upon the authentication response.

One aspect of the present invention can include a method for providing call authorization within a telephony network. The method can include receiving a telephony connectivity request for establishing a telephony voice channel between an originating device and a receiving device. Additionally, the call authorizer can access receiving device specific information, wherein the device specific information can include an authorization requirement. In a particular embodiment, the call authorizer can determine a phone number associated with the originating device and modify at least a portion of the authorization requirement responsive to the phone number.

In one embodiment, the call authorizer can transmit an authorization request to the originating device responsive to the connectivity request. In another embodiment, the call authorizer can include an encrypted key within the authorization request, wherein successful decryption of the encrypted key results in an approved authorization code that satisfies the authorization requirement. Notably, the authorization request can be conveyed through a ringback channel, having a bandwidth suitable for propagating a ringback signal. The ringback signal is an intermittent audio tone signifying to the originating device that the receiving device is ringing.

Additionally, the call authorizer can receive a digitally encoded signal specifying an authorization code from the originating device. This authorization code can be transmitted by the originating device via a CNG channel. The CNG channel can be a frequency range within a voice channel that is capable of transporting a FAX CNG signal from an originating device to the call authorizer. In one embodiment, the CNG channel can be the frequency range of 900–1,300 Hz. In another embodiment, once the authorization code is received by the call authorizer, the call authorizer must demodulate a carrier signal operating at a base frequency of about 1,100 Hz. In yet another embodiment, the call authorizer can decode the digitally encoded data within the authorization code. This decoding step can retrieve information encoded by toggling a frequency of about 1,100 Hz between an on and an off state. The method can determine whether the authorization code satisfies the authorization requirement and responsively provide a connection between the originating device and the receiving device.

In a particular embodiment, the method can also relay an authorized caller signal to the receiving device that contains digitally encoded information that identifies an originating party. Notably, in such an embodiment, the actual identity of an originating party, as opposed to a default party associated with the originating device, can be determined by a receiving party before a connection is established. In another embodiment, the call authorizer can receive the connectivity request and can receive the authorization code through a first connectivity channel. This first connectivity channel can be a voice channel within a telephony network. The connection being authorized by the call authorizer can, however, specify a second connectivity channel that is not within the voice channel used by the first connectivity channel. For example, in one such embodiment, the first connectivity channel can be a voice channel of a digital subscriber line, and the second connectivity channel can be a data channel of the digital subscriber line. In another embodiment, the second connectivity channel can utilize satellite broadcasts or cable to relay information to the originating device. Accordingly, such an embodiment can be used to provide television broadcasting to a satellite receiver, where such broadcasts are authorized through a telephone line connected to the satellite receiver.

Another aspect of the present invention can include a system for providing call authorization including a profile repository containing receiving device specific information. The system can also include a call authorizer communicatively linked to a telephony network and to the profile repository. The call authorizer can be configured to send and receive digitally encoded pre-connection telephony signals specifying authentication information. In one embodiment, the call authorizer can be further configured to generate a digitally encoded signal specifying an encrypted key that must be decrypted by an originating device before a telephony connection is established between the originating device and a receiving device. In another embodiment, the call authorizer can be a network element within a telephony network. In yet another embodiment, the call authorizer can be a switch independent application.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for pre-connection call authentication within a telephony network. In particular, the system provides recipient-side call authorization. The system can access a call authorizer when a connectivity request reaches a destination telephony switch, the destination telephony switch being the telecommunication node to which the receiving device connects. Thereafter, the call authorizer can prompt an originating device for an authorization code via a ringback channel. The establishment of a connection to a receiving device can be dependant on receiving an acceptable authorization code through a CNG channel. Both the ringback channel and the CNG channel can be frequency ranges within the voice band that can convey signals before a telephony connection is established.

Figure 1:
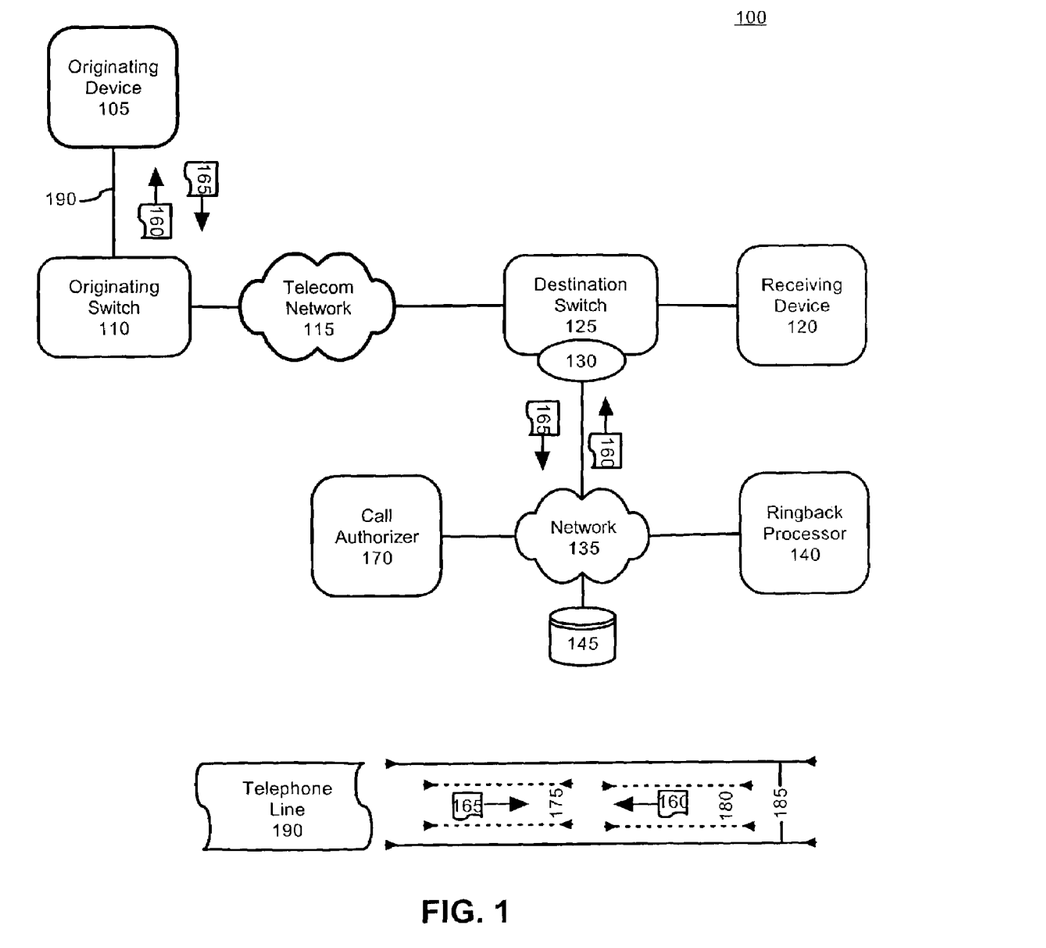
FIG. 1 is a schematic diagram illustrating an exemplary telephony system including a call authorizer in accordance with the inventive arrangements disclosed herein.

FIG. 1 is a schematic diagram illustrating a telephony system 100 which can include a call authorizer 170 in accordance with the inventive arrangements disclosed herein. As shown in FIG. 1, the system 100 can include an originating switch 110, a telecom network 115, a destination switch 125, the call authorizer 170, as well as a telephone line 190 showing a ringback channel 180 and a CNG channel 175. The originating switch 110 can be a node within a telephony network that can facilitate the connection between telephony devices, such as telephones and other customer premise equipment.

Notably, switches, such as the originating switch 110 and the destination switch 125, can connect customer premise equipment to the telecom network 115. Hence, the originating switch 110 can connect an originating device 105 to the telecom network 115. Similarly, the destination switch 125 can be a node within the telecom network 115 communicatively linking a receiving device 120 to the telecom network 115. Since one switch can connect many telephony devices to a given network, both the originating device 105 and the receiving device 120 can be connected to the same switch. Accordingly, embodiments can exist where the originating switch 110 and the destination switch 125 are the same switch.

The telecom network 115 can be any series of points or nodes connected by a series of interconnection paths capable of connecting the originating switch 110 to the destination switch 125. For example, the telecom network 115 can be a circuit-switched network included within the public switched telephone network (PSTN). In another embodiment, portions of the telecom network 115 can be a commercially owned proprietary packet-switched network with Voice over Internet Protocol (VoIP) capabilities.

The telephone line 190 can be a line that connects a telephony device (customer premise equipment) to the telecom network 115. Physically, the telephone line 190 can include, but is not limited to, such a medium as a twisted pair, a coaxial cable, a fiber optic line, and even a wireless transmission pathway. The telephone line 190 can conduct signals within a voice channel 185. The voice channel 185 can be a bandwidth segment, typically 64 kbps, utilized by a telephony network for a single voice connection. The voice channel 185 can operate within the voice band, wherein the voice band is the frequency range between approximately 0 and 3,400 Hz, which is sufficient bandwidth to "carry" intelligible human speech. Ordinary telephone service is often restricted to the voice channel 185, while other services, such as a digital subscriber line (DSL) service, can utilize a broader frequency range.

A CNG channel 175 can include a frequency range within the voice band through which an authorization code 165 can be transmitted. While the CNG channel 175 is always capable of transporting a pre-connection FAX CNG signal, the exact frequency range available within the CNG/channel 175 can vary according to frequency filters having a passband at or around 1,100 Hz. For example, in one embodiment, frequencies below approximately 300 Hz and above approximately 2,400 Hz can be filtered by telephony equipment. The resulting CNG channel 175 can include the frequency range from approximately 300 Hz to 2,400 Hz. In another embodiment, all frequencies that deviate from the 1,100 Hz frequency (used by the FAX CNG signal according to T 0.30 protocol) by more than 200 Hz are filtered. Accordingly, the CNG channel 175 can include the frequency range from approximately 900 Hz to 1,300 Hz.

In one embodiment, signals within the CNG channel 175 can be digitally encoded by intermittently turning on and off a frequency of about 1,100 Hz, where an "on state" can represent a digital one, and an "off state" can represent a digital zero, or vice versa. In an alternate embodiment, signals within the CNG channel 175 can utilize a modulation technique with a base frequency of about 1,100 Hz. Modulation techniques can include, but are not limited to, phase key shifting (PKS) and frequency key shifting (FKS).

The ringback channel 180 can include a frequency range within the voice channel 185 wherein at least one authorization request 160 can be conveyed to the originating device 105. The ringback channel 180 can be a back channel through which a ringback signal is ordinarily sent from a telephony switch to an originating device 105. The ringback signal is an intermittent audio tone that the originating device 105 receives after dialing a number, when the distant end of the circuit or the receiving device 120 is receiving a ringing signal. While the ringback signal is typically an analog signal, the authorization request 160 can be a digital signal conveyed through the ringback channel 180.

The call authorizer 170 can be an application capable of performing call authorizations for at least one receiving device 120. In so doing, the call authorizer 170 can relay authorization data to an originating device 105 via the ringback channel 180 and receive authorization data from the originating device 105 via the CNG channel 175. All conveyances of authorization data to and from the call authorizer 170 can occur before a connection is established between the originating device 105 and the receiving device 120. In one embodiment, the call authorizer 140 can be a network element that interfaces with the destination switch 125 through a gateway 130. In another embodiment, the call authorizer 170 can be a stand-alone solution interfacing directly with the destination switch 125 without utilizing gateway 130 as an intermediary. In yet another embodiment, the call authorizer 170 can be a program disposed within the destination switch 125.

The call authorizer 170 can utilize encrypted keys to determine if a connectivity request is to be granted. Any type of encryption can be used including symmetric key and public key encryption schemes. For example, the call authorizer can send an encrypted key to the originating device 105. This encrypted key can then be decrypted, utilizing a decryption key possessed by the originating device 105. The originating device 105 can then send an authorization code 165 as proof of successful decryption. Only those devices possessing an approved decryption key can construct an approved authorization code. The returned authorization code 165 can be utilized by the call authorizer 170 to determine if a connectivity request should be granted or denied.

In order to determine the necessary authorizations for a particular receiving device 120, the call authorizer 170 can access a profile repository 145. The profile repository 145 can contain receiving device specific information. In one embodiment, this information can be modified by a user of the receiving device 120. The profile repository 145 can be a data store internal or external to the call authorizer 170. Additionally, the profile repository 145 can include different authorization requirements for different originating devices. For example, in one embodiment, when the originating device 105 is located within the same building as the receiving device 120 no authorization may be necessary. Yet, authorization can be necessary within that embodiment for originating devices located outside the building in which the receiving device 120 is located.

While in one embodiment the call authorizer 170 can convey authorization data to the originating device 105 without assistance, in another embodiment, a ringback processor 140 can assist in these transmissions. The ringback processor 140 can be an application capable of receiving data and conveying this data as analog and digital signals over the ringback channel 180. The ringback channel 180 can be a segment of telephony bandwidth within the voice frequency range (approximately 0–3,400 Hz) reserved for pre-connection transmissions between a telephony switch and the originating device 105. Typically, an intermittent analog signal representing the ringing of a receiving device is sent along this ringback channel.

The network 135 can be any series of points or nodes connected by a series of interconnection paths capable of connecting destination switch 125 to the call authorizer 170 and transporting packet-switched messages between connected nodes. For example, the network 135 can be the Internet. Alternately, the network 135 can be an intranet utilized by a telecom carrier that owns the destination switch 125. Additionally, a gateway 130 can be used to interface between the call authorizer 170 and the destination switch 125. In one embodiment, the gateway 130 can facilitate switch independent application programming by providing a set of open network application programming interfaces (APIs). These interfaces can translate standardized telephony commands to switch specific ones. Additionally, the gateway 130 can function as a layer of abstraction between a telephony network and an application, providing standardized routines to ease many programming tasks.

For example, in one embodiment, the gateway 130 can be a Parlay gateway capable of interfacing any Parlay compliant application to a Parlay compliant telecom network 115. In another embodiment, the gateway 130 can be a software platform, such as the International Business Machines (IBM) Resource Manager, which is commercially available from International Business Machines Corporation of Armonk, N.Y., that can provide the call authorizer 170 value-added telephony applications and services. In yet another embodiment, the gateway 130 can include Java APIs for Integrated Networks (JAIN) allowing the call authorizer 170 to be implemented as a switch independent JAIN compliant application.

While the voice channel 185 can be utilized by the call authorizer 170 for transmitting authorization data, the connectivity channel being authorized can be a channel outside the voice channel 185. For example, because a digital subscriber line (DSL) can simultaneously carry both data and voice signals along an ordinary telephone line, the call authorizer 170 can utilize the voice channel 185 of the DSL line to authorize the constantly connected data channel of the DSL line. Such an arrangement can provide additional security to a DSL connection preventing unauthorized users from utilizing the bandwidth of authorized DSL subscribers.

Another example of a connectivity channel outside the voice channel being authorized by the call authorizer 170 can involve direct satellite television broadcasting or cable. For example, a satellite reception device can require periodic verifications through a connected telephone line 190 in order to receive specified satellite broadcasts. Thus, the call authorizer 170 can be utilized to prevent receiver units using gray market cards that spoof a receiver into granting unauthorized broadcast accesses. Such a reception device could, for example, stop functioning after not receiving a signal from the call authorizer 170 after a predefined period.

In operation, the originating device 105 can place a call to the receiving device 120 through the telecom network 115. The originating device 105 can send a connectivity request through the originating switch 110 across the telecom network 115 to the destination switch 125. Notably, when both the originating device 105 and the receiving device 120 are connected to the same switch, the connectivity request can be handled directly by that switch, which can function as both the originating switch 110 and the destination switch 125. The destination switch 125 can then send an authorization inquiry to the call authorizer 170. The call authorizer 170 can utilize the profile repository 145 to determine that an authorization code is necessary before a connection with the receiving device 120 is permitted.

Thereafter, the call authorizer 170 can construct an authorization request 160. This authorization request 160 can be conveyed to the originating device 105 via the ringback channel 180. Notably, the ringback processor 140 can be utilized to facilitate the transmission of the authorization request 160. This authorization request 160 can contain an encrypted key that the originating device 105 can decrypt. Upon decrypting the encrypted key, an authorization code 165 can be generated. The originating device 105 can transmit the authorization code 165 to the call authorizer 170 via the CNG channel 175. The call authorizer 170 can then grant or deny connectivity to the receiving device 120 based upon the authorization code 165.

It should be noted that the call authorizer 170 can, but need not, submit an encrypted key to the originating device 105. In one embodiment, the call authorizer 170 can utilize a password encoded within the authorization code 165 to determine connectivity. This password need not be based on an encryption scheme. In another embodiment, no authorization request 160 need be sent from the call authorizer 170 at all. In such an embodiment, the originating device 105 can submit an authorization code 165 to the call authorizer 170 at or about the time when the connectivity request is submitted or shortly thereafter. In such an embodiment, any connectivity requests sent without an accompanying authorization code 165 can be automatically denied.

Figure 2:
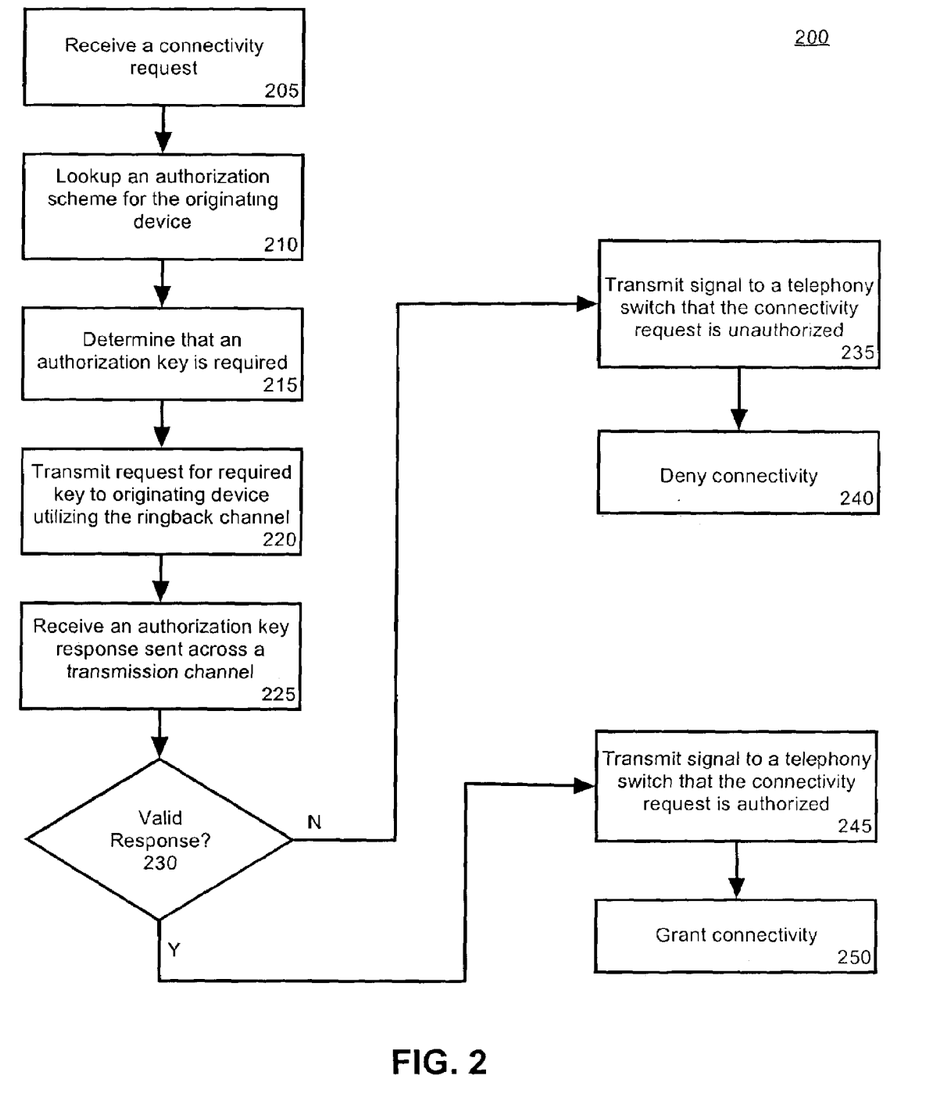
FIG. 2 is a flow chart illustrating a method for implementing a call authorizer using the system of FIG. 1.

FIG. 2 is a flow chart illustrating a method 200 for implementing a call authorizer using the system of FIG. 1. The method can be performed in the context of pre-connection call authorization where an originating party using an originating device attempts to establish a connection with a receiving party using a receiving device. Moreover, the method presupposes the existence of a call authorizer that utilizes a cryptography key scheme to authorize calls. The method 200 can begin in step 205 where a call authorizer receives a connectivity request.

In step 210, the call authorizer can access a data storage area to determine what authorization scheme, if any, is associated with the receiving device. In one embodiment, each receiving party can individually modify the authorization scheme for any receiving devices that the receiving party possesses. Authorization schemes can vary according to a telephone number associated with a receiving device. In step 215, a determination can be made in reference to the authorization scheme accessed that an authorization key is required. Accordingly, some cryptography key, such as a public key, can be required before a connection to the receiving device is permitted.

In step 220, the call authorizer can transmit a request for a required key to the receiving device through a ringback channel. In step 225, an authorization code can be received through the CNG channel. Notably, the authorization code can contain a digitally encoded signature that results from the originating device decrypting the cryptography key sent within the authorization request. In certain embodiments, the original connection request sent from the originating device can include an authorization code containing either a password or a previously determined digitally encoded signature. In such an embodiment, step 220 can be rendered unnecessary and can be skipped by the method 200.

In step 230, the method can compare the authorization code with a desired response and determine if authorization should be granted. If the authorization code does not satisfy the requirements of the call authorizer, the method can proceed to step 235, where the call authorizer can signal that the connectivity request is unauthorized. In step 240, the authorization manager can then deny the originating device connectivity.

If the authorization code indicates authorization should be granted, however, the method can proceed to step 245, where the call authorizer can signal that the connectivity request is authorized. In step 250, the ringback processor can grant the originating device connectivity to the receiving device. Thereafter, a communication channel can be established between the two devices.

Figure 3:
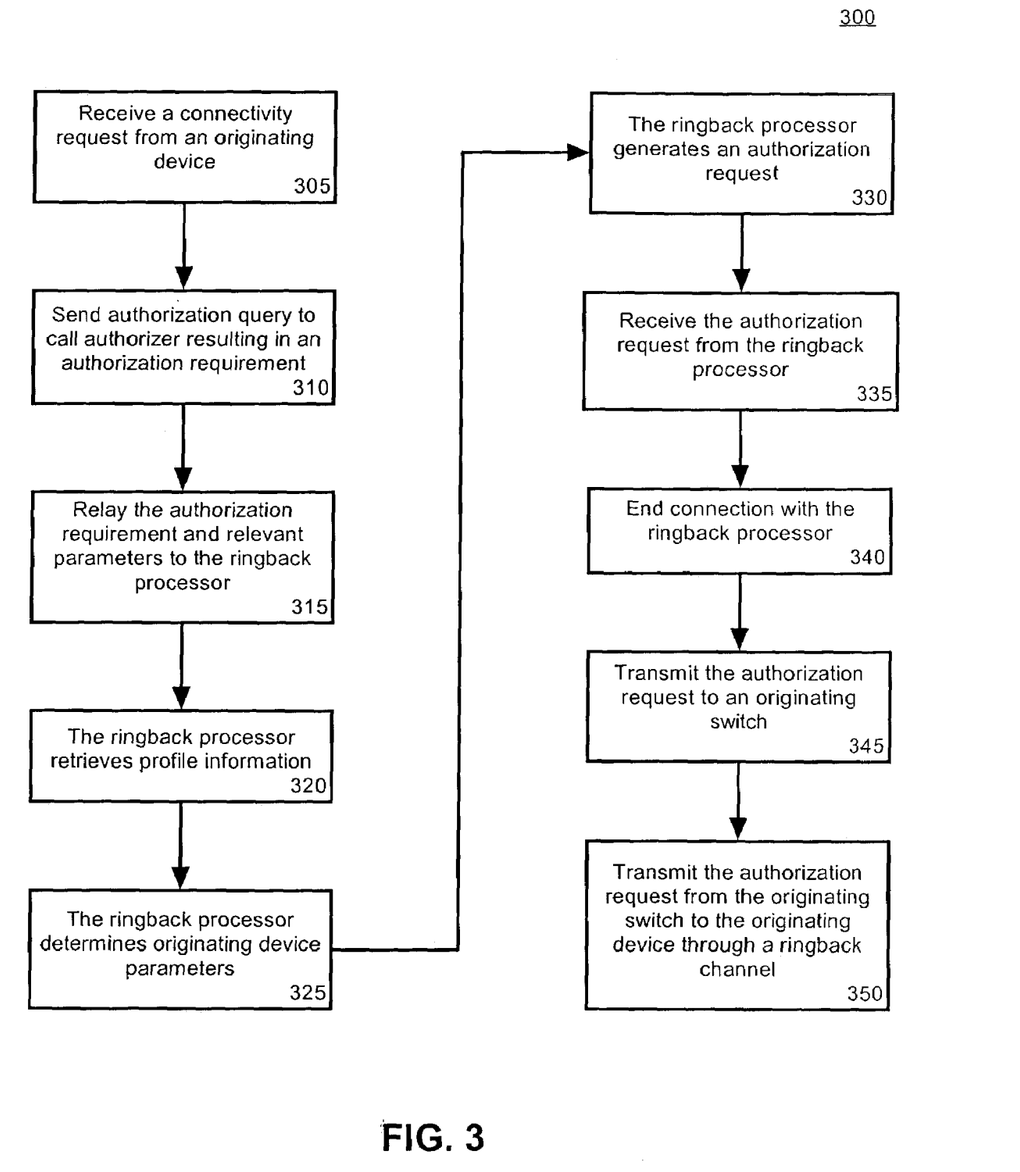
FIG. 3 is a flow chart illustrating a method for utilizing a ringback channel to transmit an authorization request using the system of FIG. 1.

FIG. 3 is a flow chart illustrating a method 300 for utilizing a ringback channel to transmit an authorization request using the system of FIG. 1. The method 300 can be performed in the context of an attempted telephony connection. The method 300 begins in a state before a connection is established between an originating device and a receiving device. The method assumes that a telephony environment exists where a communication pathway is available to a destination switch through which the destination switch can relay a ringback transmission to an originating device.

The method 300 can begin in step 305, where a destination switch receives a connectivity request from the originating device. While in many cases, the connectivity request will be for a dedicated circuit-switched voice connection, the method can operate equally as well within a packet-switched environment. In step 310, the method can send an authorization query to the call authorizer. The call authorizer can determine from the authorization query that additional information is needed from the originating device before authorization can be granted. Accordingly, an authorization requirement can be generated that details the necessary additional information.

In step 315, the authorization requirement and relevant parameters can be relayed from the call authorizer to the ringback processor. The ringback processor can generate a signal configured to prompt a user of the originating device for the necessary additional information specified by the authorization requirement. This signal generated by the ringback processor can be called an authorization request. Relevant parameters can include, but are not limited to, originating device identification parameters, receiving device parameters available to the destination switch, and special processing parameters related to the authorization requirement.

In step 320, the ringback processor can retrieve profile information concerning the receiving device. For example, profile information can include, but is not limited to, such information as the called telephone number, the name of the called party, capabilities of the called device, receiving device preferences, security requirements for establishing a connection, and unique connection requirements. The profile information can be located in an external data store, can be contained within the ringback processor, or can be contained within parameters passed to the ringback processor.

In step 325, the ringback processor can determine originating device parameters. In one embodiment, the type of authorization request can be modified according to the capabilities of an originating device. For example, if an originating device is configured to accept a digitized authorization key, such a key can be constructed and sent to the originating device. If the originating device is not configured to accept such a key, however, an analog voice signal can be generated requesting that a user of the originating device provide authorization data as specified by the authorization requirement.

In step 330, the ringback processor can generate an authorization request. This authorization request can include analog and/or digital signals. In step 335, the ringback processor can send the authorization request to the destination switch. Thereafter, in step 340 the connection with the ringback processor can be terminated. In step 345, the ringback transmission can be relayed through the telephony network to the originating switch. Notably, if the originating device and receiving device are both connected to the same switch, step 345 is unnecessary. In step 350, the originating switch can transmit the authorization request to the originating device through a designated ringback channel. This ringback channel can be a frequency range within the voice band designated for ringback signals.

It should be appreciated that while the embodiment described in FIG. 3 includes a ringback processor and extensively utilized its capabilities to transmit the authorization request to the originating device, the invention does not require a separate ringback processor. Instead, the functionality attributed to the ringback processor in FIG. 3 can be incorporated within the call authorizer.

Figure 4:
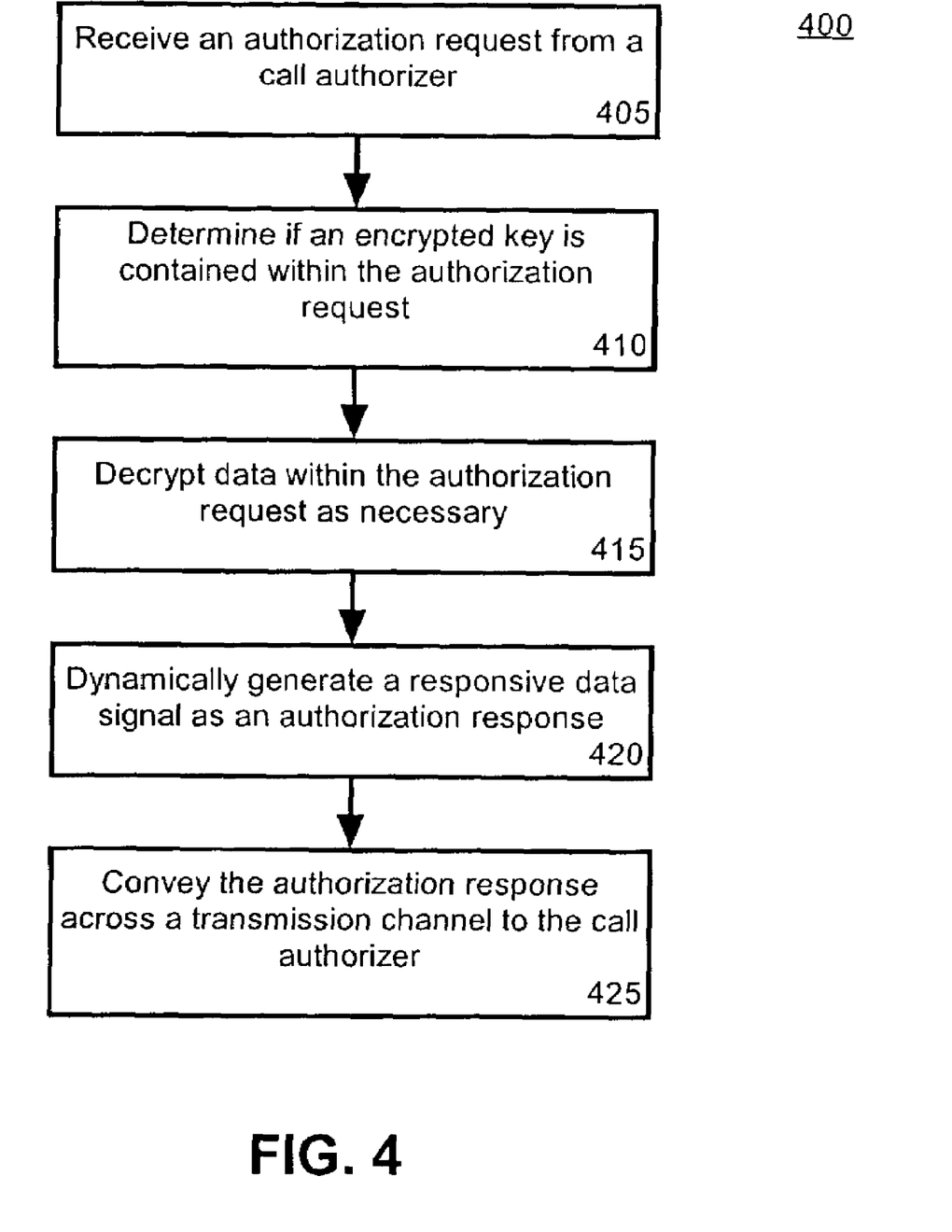
FIG. 4 is a flow chart illustrating a method for utilizing a CNG channel to send an authorization code to a call authorizer using the system of FIG. 1.

FIG. 4 is a flow chart illustrating a method 400 for utilizing a CNG channel to send an authorization code to a call authorizer using the system of FIG. 1. The method 400 can be performed in the context of pre-connection telephony signaling from an originating device to a call authorizer. Furthermore, the method 400 presupposes that the call authorizer submits to an originating device an authorization request containing an encrypted key used to construct an authorization code. The method 400 can begin in step 405 where the originating device receives an authorization request from the call authorizer. This authorization request can be transmitted across a ringback channel.

In step 410, the originating device can determine if an encrypted key is contained within the authorization request. In step 415, the originating device can decrypt data contained within the authorization request as necessary. Notably, cryptography schemes such as symmetric keys and public keys can be utilized for the decryption process within method 400. In embodiments utilizing key encryption, the originating device can contain a decryption key capable of accessing the data from within the authorization request. In other embodiments, the authorization request can prompt the originating device for a particular code or password required by the call authorizer.

Once necessary decryption actions have been taken, the method can proceed to step 420, where a data signal can be responsively generated. This data signal can be the authorization code that the call authorizer has requested. In step 425, the method can convey this data signal across a CNG channel. Notably, the conveyance of the data signal, as well as all previously mentioned steps, can occur before a voice connection is established between the originating and receiving devices. Additionally, the CNG channel across which the data signal is conveyed can be the previously detailed frequency range centered at 1,100 Hz.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing pre-connection call authorization within a telephony network comprising the steps of:
   receiving at a destination switch a telephony connectivity request for establishing a telephony voice channel between an originating device and a receiving device, said receiving device connected to said destination switch;
   identifying said receiving device specified by said connectivity request;
   accessing receiving device specific information from a call authorizer connected to said destination switch and remote from said receiving device, wherein said device specific information includes an authorization requirement;
   sending an authorization request via a ringback channel from said destination switch to said originating device without traversing a data channel;
   sending a digitally encoded signal specifying an authorization code from said originating device in response to the authorization request, said signal being conveyed within at least one pre-connection transmission channel, the pre-connection-transmission channel being distinct from the ringback channel and utilized to convey information before a telephony connection is established with the originating device;
   determining whether said authorization code satisfies said authorization requirement; and,
   establishing said telephony voice channel between said originating device and said receiving device responsive to said determining step, wherein said identifying, accessing, and determining steps occur after the originating device provides the telephony connectivity request and before a telephony voice channel involving the originating device is established.

2. The method of claim 1, wherein said accessing step further comprises the steps of:
   determining a phone number associated with said originating device; and,
   modifying at least a portion of said authorization requirement responsive to said phone number.

3. The method of claim 1, further comprising the step of relaying an authorized caller signal to said receiving device within a pro-connection transmission channel, wherein said authorized caller signal contains digitally encoded information at least a portion of which has been generated based upon said authorization code, wherein at least a portion of said digitally encoded information identifies an originating party.

4. The method of claim 1, wherein said receiving of said connectivity request and said receiving of said authorization code are received through a first connectivity channel, and wherein said first connectivity channel is a voice channel within a telephony network, and wherein said providing step specifies a second connectivity channel that is not within said voice channel of said first connectivity channel.

5. The method of claim 4, wherein said first connectivity channel is a voice channel of a digital subscriber line, and wherein said second connectivity channel is a data channel of said digital subscriber line.

6. The method of claim 4, wherein said second connectivity channel is at least one of the group consisting of a satellite broadcast channel and a cable channel.

7. The method of claim 1, wherein said at least one pre-connection transmission channel comprises a CNG Channel.

8. The method of claim 7, said receiving step for said authorization code further comprising:
demodulating a carrier signal within said digitally encoded signal that operates at a base frequency of about 1,100 Hz.

9. The method of claim 7, wherein said determining step further comprises the step of decoding said digitally encoded data within said authorization code, wherein said decoding step retrieves information encoded by toggling a frequency of about 1,100 Hz between an on and an off state.

10. The method of claim 7, wherein said CNG channel is within the frequency range of 900–1,300 Hz.

11. The method of claim 1, further comprising the step of transmitting an authorization request to said originating device responsive to said connectivity request, wherein said receiving of said authorization code step is responsive to said transmitting step.

12. The method of claim 11, wherein said transmitting step further comprises the step of including an encrypted key within said authorization request.

13. The method of claim 11, wherein said transmitting step further comprises conveying said authorization request to said originating device via a ringback channel.

14. A system for providing call authorization comprising:
a profile repository containing receiving device specific information; and,
a call authorizer communicatively linked to a telephony network and to said profile repository, configured to send via a ringback channel and receive via a pre-connection transmisson channel digitally encoded pre-connection telephony signals specifying authentication information;
wherein said authentication information comprises an authorization request conveyed via a ringback channel from a destination switch of said telephony network to a call-originating device without traversing a data channel, and a digitally encoded signal specifying an authorization code conveyed from the call-originating device to the destination switch via at least one pre-connection transmission channel distinct from the ringback channel.

15. The system of claim 14, wherein said call authorizer is further configured to generate a digitally encoded signal specifying an encrypted key that must be decrypted by an originating device before a telephony connection is established between said originating device and a receiving device.

16. The system of claim 14, wherein said call authorizer is a network element within a telephony network.

17. The system of claim 16, wherein said call authorizer is a switch independent application.

18. A computer readable storage having stored thereon, a computer program having a plurality of code sections, said code sections executable by a machine for causing the machine to perform the steps of:
receiving at a destination switch a telephony connectivity request for establishing a telephony voice channel between an originating device and a receiving device, said receiving device connected to said destination switch;
identifying said receiving device specified by said connectivity request;
accessing receiving device specific information from a call authorizer connected to said destination switch and remote from said receiving device, wherein said device specific information includes an authorization requirement;
sending an authorization request via a ringback channel from said destination switch to said originating device without traversing a data channel;
sending a digitally encoded signal specifying an authorization code from said originating device in response to the authorization request, said signal being conveyed within at least one pre-connection transmission channel, the preconnection-transmission channel being distinct from the ringback channel and utilized to convey information before a telephony connection is established with the originating device;
determining whether said authorization code satisfies said authorization requirement; and,
establishing said telephony voice channel between said originating device and said receiving device responsive to said determining step, wherein said identifying, accessing, and determining steps occur after the originating device provides the telephony connectivity request and before a telephony voice channel involving the originating device is established.

19. The machine readable storage of claim 18, wherein said accessing step further comprises the steps of:
determining a phone number associated with said originating device; and,
modifying at least a portion of said authorization requirement responsive to said phone number.

20. The machine readable storage of claim 18, further comprising the step of relaying an authorized caller signal to said receiving device within a pre-connection transmission channel, wherein said authorized caller signal contains digitally encoded information at least a portion of which has been generated based upon said authorization code, wherein at least a portion of said digitally encoded information identifies an originating party.

21. The machine readable storage of claim 18, wherein said receiving of said connectivity request and said receiving of said authorization code are received through a first connectivity channel, and wherein said first connectivity channel is a voice channel within a telephony network, and wherein said providing step specifies a second connectivity channel that is not within said voice channel of said first connectivity channel.

22. The machine readable storage of claim 21, wherein said first connectivity channel is a voice channel of a digital subscriber line, and wherein said second connectivity channel is a data channel of said digital subscriber line.

23. The machine readable storage of claim 21, wherein said second connectivity channel is at least one of the group consisting of a satellite broadcast channel and cable channel.

24. The machine readable storage of claim 18, wherein said at least one pre-connection transmission channel comprises a CNG Channel.

25. The machine readable storage of claim 24, said receiving step for said authorization code further comprising:
demodulating a carrier signal within said digitally encoded signal that operates at a base frequency of about 1,100 Hz.

26. The machine readable storage of claim 24, wherein said determining step further comprises the step of decoding said digitally encoded data within said authorization code, wherein said decoding step retrieves information encoded by toggling a frequency of about 1,100 Hz between an on and an off state.

27. The machine readable storage of claim 24, wherein said CNG channel is within the frequency range of 900–1,300 Hz.

28. The machine readable storage of claim 18, further comprising the step of transmitting an authorization request to said originating device responsive to said connectivity request, wherein said receiving of said authorization code step is responsive to said transmitting step.

29. The machine readable storage of claim 28, wherein said transmitting step further comprises the step of including an encrypted key within said authorization request.

30. The machine readable storage of claim 28, wherein said transmitting step further comprises conveying said authorization request to said originating device via a ringback channel.

* * * * *